United States Patent [19]
Yamashita et al.

[11] Patent Number: 6,101,271
[45] Date of Patent: Aug. 8, 2000

[54] GRADATION CORRECTION METHOD AND DEVICE

[75] Inventors: Haruo Yamashita, Osaka; Hideshi Ishihara, Takatsuki; Yasuki Matsumoto, Hirakata, all of Japan

[73] Assignee: Matsushita Electrial Industrial Co., Ltd, Osaka-fu, Japan

[21] Appl. No.: 08/821,794

[22] Filed: Mar. 21, 1997

Related U.S. Application Data

[62] Division of application No. 08/366,028, Dec. 29, 1994, Pat. No. 5,661,575, which is a continuation of application No. 07/772,559, Oct. 7, 1991, abandoned.

[30] Foreign Application Priority Data

Oct. 9, 1990 [JP] Japan .................................. 2-271119

[51] Int. Cl.$^7$ ................ G06K 9/00; G03F 3/08
[52] U.S. Cl. .......................... 382/167; 358/521
[58] Field of Search .................... 382/167, 162, 382/164, 165; 358/518–521, 519, 520, 523, 1.9; 348/234, 254; H04N 1/40, 1/46, 1/60

[56] References Cited

U.S. PATENT DOCUMENTS

| | | |
|---|---|---|
| 3,875,583 | 4/1975 | Poetsch et al. . |
| 4,812,903 | 3/1989 | Wagensonner et al. . |
| 4,831,434 | 5/1989 | Fuchsberger . |
| 4,833,527 | 5/1989 | Kondo . |
| 4,962,419 | 10/1990 | Hibard et al. . |
| 4,965,664 | 10/1990 | Udagawa et al. . |
| 4,975,786 | 12/1990 | Katayama et al. . |
| 4,992,862 | 2/1991 | Gabor . |
| 5,166,740 | 11/1992 | Trew . |
| 5,194,943 | 3/1993 | Tomita et al. . |
| 5,196,937 | 3/1993 | Kageyama . |
| 5,287,209 | 2/1994 | Hiratsuka et al. . |
| 5,296,920 | 3/1994 | Sakaue et al. ............ 358/521 |
| 5,517,333 | 5/1996 | Sakaue et al. ............ 358/520 |
| 5,661,575 | 8/1997 | Yamashita et al. ........ 358/519 |

FOREIGN PATENT DOCUMENTS

| | | |
|---|---|---|
| 62-286379 | 12/1987 | Japan . |
| 63-232591 | 9/1988 | Japan . |
| 64-51890 | 6/1989 | Japan . |

*Primary Examiner*—Madeleine Nguyen
*Attorney, Agent, or Firm*—Ratner & Prestia

[57] ABSTRACT

The gradation correction device includes a luminance signal convertor to generate a luminance signal from the input R, G, B signals, a correction coefficient calculator which calculates the ratio to the luminance signal of the luminance signal after gamma correction to the predetermined gradation characteristics, and a multipliers to multiply the output from the correction coefficient calculator by each of the R, G, and B input signals. When the gradation correction is applied, effective brightness adjustment can be applied with no change in hue and saturation and without exceeding the dynamic range of a device.

4 Claims, 12 Drawing Sheets

| A11 A10 A9 A8 | g |
|---|---|
| 0 0 0 0 | 0.6 |
| 0 0 0 1 | 0.65 |
| 0 0 1 0 | 0.7 |
| 0 0 1 1 | 0.75 |
| 0 1 0 0 | 0.8 |
| 0 1 0 1 | 0.85 |
| 0 1 1 0 | 0.9 |
| 0 1 1 1 | 0.95 |
| 1 0 0 0 | 1.0 |
| 1 0 0 1 | 1.05 |
| 1 0 1 0 | 1.1 |
| 1 0 1 1 | 1.15 |
| 1 1 0 0 | 1.2 |
| 1 1 0 1 | 1.25 |
| 1 1 1 0 | 1.3 |
| 1 1 1 1 | 1.35 |

GRADATION CORRECTION METHOD AND DEVICE

This application is a division of application Ser. No. 08/366,028, filed Dec. 29, 1994, now U.S. Pat. No. 5,661,575 (allowed); which is a continuation of Ser. No. 07/772,559, filed Oct. 7, 1991 (abandoned).

BACKGROUND OF THE INVENTION

1. Field of the Invention

The present invention relates to the gradation conversion of a video signal which is suited for adjusting the brightness of an input video signal in a video camera or video printing device.

2. Description of the Prior Art

With recent advances in hard copy printing technologies, and particularly with full-color hard copy printing technologies, it has become possible to faithfully reproduce original images using such printing technologies as subliminal thermal transfer printing. Color reproduction technologies have advanced to the point where colors can be reproduced with silver halide photographic quality depending upon the printing material and image processing technologies applied. By using HDTV and similar high resolution video signals, even the resolution of these reproductions has approached photographic quality.

However, the dynamic range of such printing devices is typically only several multiples of ten between low and high ends thereof, and is even more than ten times worse than that of an average CRT. As a result, it is only possible to reproduce an image comparable to that of the CRT when the dynamic range of the input signal does not exceed the dynamic range of the printer, and the dynamic range of the printer is used to the maximum limit. Automatic gain control (AGC) functions and black level correction functions have therefore been proposed for such printers (Japanese Patent Laid-open Publication No. 64-51890).

Furthermore, a luminance signal offset value is normally provided for adjusting image brightness in a television receiver to effectively adjust the brightness by shifting the luminance signal level. This functions well in a CRT or other device with a wide dynamic range, but in a printer, in which the upper and lower ends of the dynamic range are normally cut off, shifting the luminance signal level to the darker side is limited by the maximum ink density, and by the density of the print medium surface to the light side. Image data is therefore lost, resulting in deteriorated image quality.

To overcome this, one method commonly used changes the gradation characteristics without changing the dynamic range and controls the brightness histogram of the image to visually adjust the image brightness.

As shown in FIG. 13(A), this is achieved by converting the gradation characteristics using gamma conversion of the R, G, B or luminance signals. To make the image brighter, the darkest and brightest parts of the image are left unchanged as shown in the figure while smoothly curving the intermediate levels to the bright side. As a result, the brightness histogram of the image is shifted to the bright side but the dynamic range is not changed, thereby adjusting the image to be visually brighter.

Another application for this technology is in backlight compensation in a video camera.

When recording a backlit subject against a bright background with a video camera, the lens iris is usually opened to admit more light. As shown in FIG. 13(B), the light areas of the background become saturated and washed out (white), eliminating color gradations. As a result, gamma conversion is an effective method of changing color gradations to brighten intermediate tones in backlit photography and video recording.

A conventional gray scale correction method as thus described functions without problems with monochrome images, but results in color hue and saturation also changing when applied to adjust the brightness of color images.

FIG. 16 shows a typical prior art gradation conversion circuit employing gamma conversion circuits for each of the RGB signals, so that R', G' and B' signals are obtained by the following equations:

$$R'=R^g$$

$$G'=R^g$$

$$B'=B^g$$

in which g is variable but is common to all of RGB signals.

FIG. 17 shows another typical prior art gradation conversion circuit employing gamma conversion circuit for luminance signal Y, so that Y' signal is obtained by the following equation:

$$Y'=Y^g$$

wherein g is variable.

The graphs in FIGS. 14(A) and 14(B) illustrate what happens when conventional gamma conversion gray scale correction is applied to RGB signals, using the circuit shown in FIG. 16, wherein the RGB values are R=0.3, G=0.4, and B=0.5. The case in which the image is made brighter, i.e., the case in which g>1, is shown in FIG. 14(A). Each of the RGB signals is converted, the output values are greater than the input values, and the image is brighter. However, since the value g is the same for the three gamma conversion circuits, such as g=1.2, the rate of increase of RGB signals is different. Thus, the ratio of the output signals R':G':B' differs from the R:G:B ratio of the input signals, resulting in such disadvantages that both hue and saturation are also changed and it is therefore not possible to accurately reproduce the colors of the source image. When the value g becomes great, the drop in saturation is particularly acute because the ratio is closer to 1:1:1.

The case in which the image is made darker, i.e., the case in which g<1, is shown in FIG. 14(B). Each of the RGB signals is converted, the output values are less than the input values, and the image is darker. Again, however, because the input R:G:B and output R':G':B' ratios differ, both hue and saturation are also changed, and because the ratio is increased, there is a noticeable divergence resulting in unnatural saturation.

Thus, when conventional brightness adjustment methods in which the gray scale is changed and the image histogram is changed are applied to color images, both hue and saturation also change.

The graph in FIG. 15 shows the case using the circuit shown in FIG. 17, in which the gray scale correction method is applied to the luminance signal to brighten the image obtained from a video signal consisting of luminance and color difference input signals. As in the previous example, the RGB values are R=0.3, G=0.4, and B=0.5, i.e., Y=0.381 because the luminance signal in the NTSC-format signal is Y=0.3*R+0.59*G+0.11*B; the color difference signals are thus R−Y=−0.081 and B−Y=0.119.

Because this method functions by varying the gray scale characteristics of the luminance signal, it is self-evident that the brightness of intermediate tones can also be changed, but the hue and saturation also change as when the gray scale characteristics of the R, G, and B signals are changed. When the image is made brighter, the value of the converted luminance signal is greater than the input signal and the image is brighter. However because the amplitude of the color difference signal remains unchanged, when the signal is returned to RGB values, R=0.404, G=0.504, and B=0.604; the R:G:B ratio thus differs from that of the original image, and because the ratio approaches 1:1:1, hue changes and saturation drops.

When the image is darkened, the hue likewise changes and the saturation expands unnaturally, but depending upon the input colors negative values may occur when the signal is returned to RGB values.

It has therefore not been possible to adjust just the brightness without changing the color by applying gray scale conversion methods to the luminance signal or separate RGB gray scale correction.

SUMMARY OF THE INVENTION

Therefore, an object of the present invention is to provide a gradation correction method and device enabling effective brightness adjustment within a defined dynamic range without changing the image hue and saturation.

To achieve the aforementioned object, a gradation correction method and device according to the present invention comprise a luminance signal conversion means to generate a luminance signal from the R,G,B signals, a correction coefficient calculation means which calculates the ratio to the luminance signal of the luminance signal after gamma correction to the desired gradation characteristics, and a multiplier to multiply the output from the correction coefficient calculation means with the input R, G, and B signals.

Furthermore, a gradation correction device according to the invention may also comprise a correction coefficient calculation means which calculates the ratio to an input luminance signal of the input luminance signal after gamma correction to the desired gradation characteristics, and a multiplier to multiply the correction coefficient output from the correction coefficient calculation means by each of two types of input color difference signals.

A gradation correction device according to the present invention extracts the luminance signal from the input R, G, and B signals, applies a gray scale conversion of desired characteristics to the luminance signal, and multiplies the ratio of the gray scale converted luminance signal to the unconverted luminance signal by each of the input R, G, and B signals to adjust the luminance component according to desired gray scale characteristics while holding the R:G.B ratio of the input and output signals equal.

Furthermore, gradation conversion whereby the luminance component is converted according to desired gradation characteristics and the R:G:B ratio of the output luminance signal and the output color difference signal is equal to the R:G:B ratio of the input luminance signal and the input color difference signal is possible by applying gradation conversion with the desired characteristics to a luminance signal to obtain a luminance signal output from a luminance and color difference signal input, and then multiplying the ratio of the gradation converted luminance signal to the unconverted luminance signal by each of the input color difference signals to obtain the color difference signal output.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
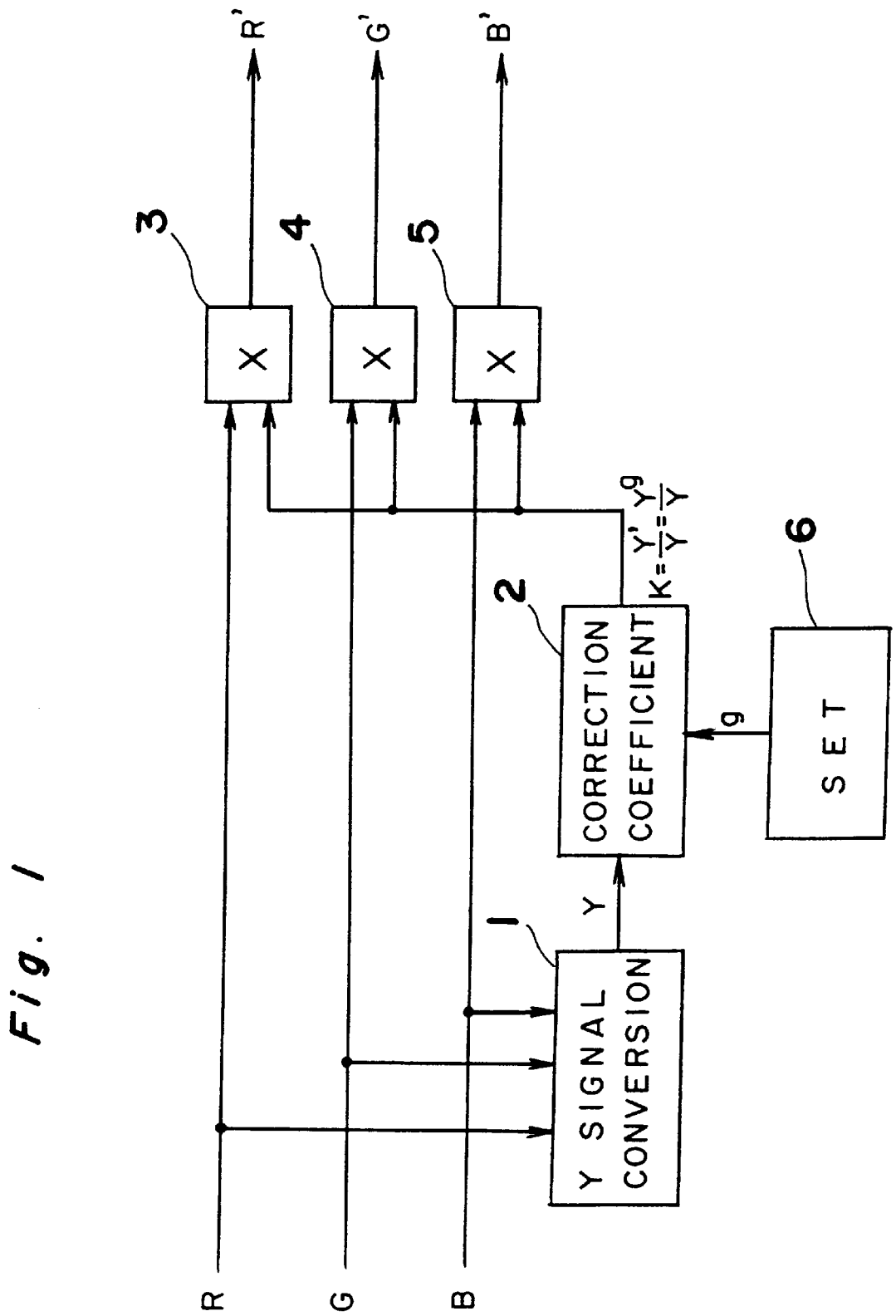
FIG. 1 is a block diagram of a gradation correction device according to a first embodiment of the present invention.

The preferred embodiments of the present invention are described hereinbelow with reference to the accompanying figures. FIG. 1 is a block diagram of a gradation correction device which visually adjusts image brightness without changing the dynamic range by changing the brightness of intermediate tone levels in RGB video input signals.

As shown in FIG. 1, the gradation correction device comprises a luminance signal conversion means 1 which generates a luminance signal Y from R, G, and B signals, a correction coefficient calculation means 2 to calculate the correction value K to be applied to red, green, and blue from the luminance signal extracted by the luminance signal conversion means 1, multipliers 3, 4, and 5 to multiply the correction value K output by the correction coefficient calculation means 2 to the R, G. and B signals, and a setting means 6 to set the characteristics of the gradation conversion, such as brightness adjustment information g, in the correction coefficient calculation means 2.

The luminance signal conversion means 1 extracts the information for the luminance component of the R, G, and B signals according to the visibility characteristics of the human eye. These characteristics differ according to the hue of the primary colors (red, green, and blue). The luminance signal conversion means 1 in an NTSC-format television is therefore comprised with conversion characteristics defined as:

$$Y=0.3*R+0.59*G+0.11*B \quad (1)$$

when $0 \leq R \leq 1$, $0 \leq G \leq 1$, $0 \leq B \leq 1$. In a gradation correction device according to the present invention, the same correction value K is multiplied with each of the R, G, and B values so that the R:G:B ratio does not change, thereby suppressing any change in the hue and saturation while changing the gradation characteristics of intermediate tone brightness, and the multipliers 3, 4, and 5 multiply the correction value K by the R, G, and B signals based on the following equations. The outputs R', G', and B' are thus defined as:

$$R'=K(Y)*R \quad (2)$$

$$G'=K(Y)*G \quad (3)$$

$$B'=K(Y)*B \quad (4)$$

where the correction value K is a function related to the luminance signal.

Furthermore, if the gamma conversion characteristics which change the gradation characteristics of the luminance signal are defined as f, the luminance signal Y' after conversion can be expressed as:

$$Y'=f(Y) \quad (5).$$

Figure 13:
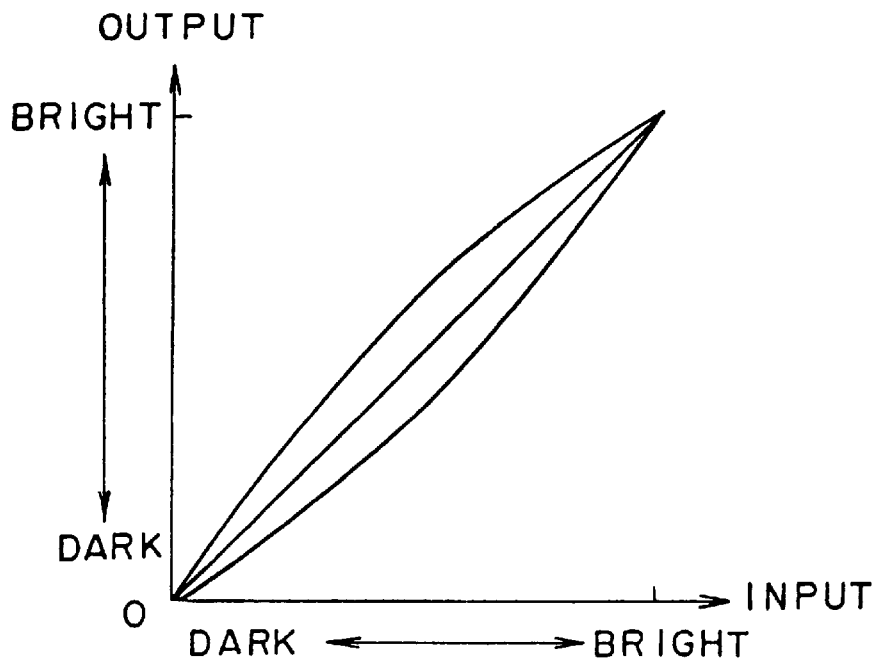
FIGS. 13(A) and 13(B) are graphs used to describe the gray scale conversion characteristics, FIGS. 14 (A) and 14(B) are graphs showing the characteristics of a conventional gray scale correction method as applied to R, G, and B signals.
Figure 13:
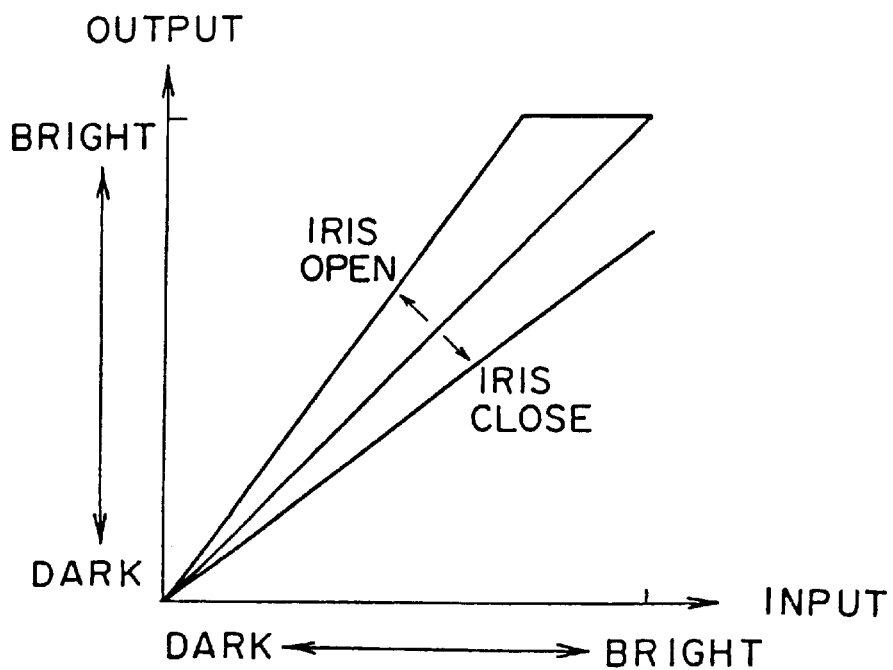
Figure 14A:
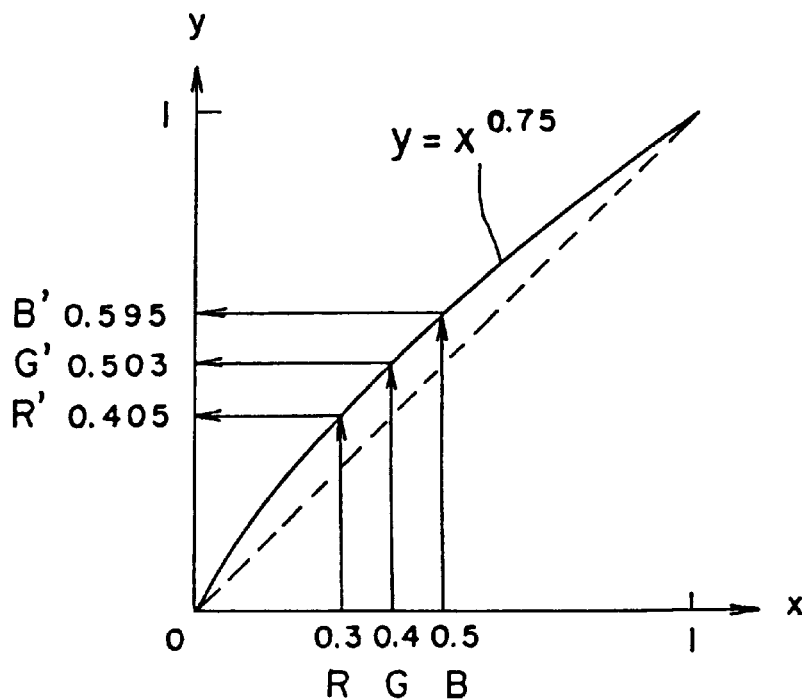
Figure 14B:
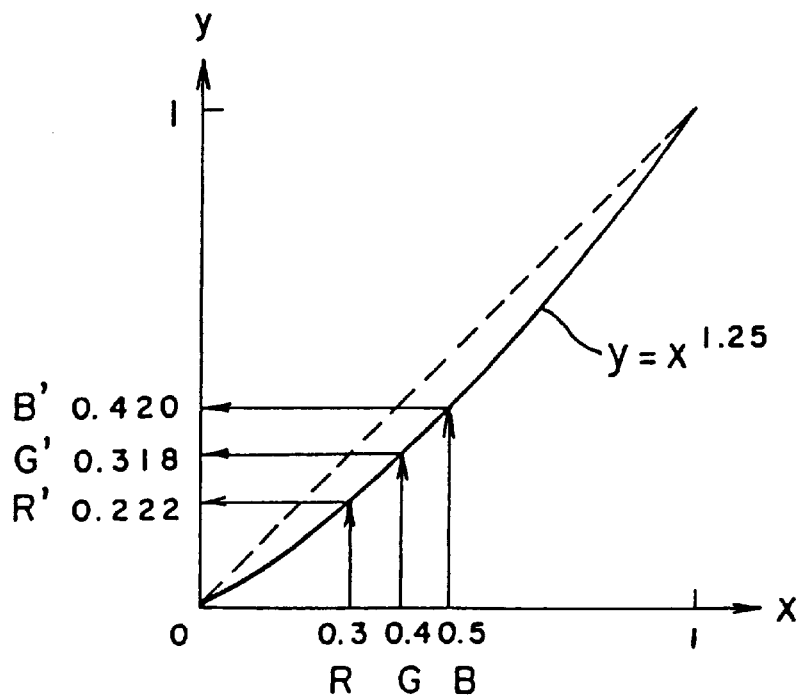
Figure 17:
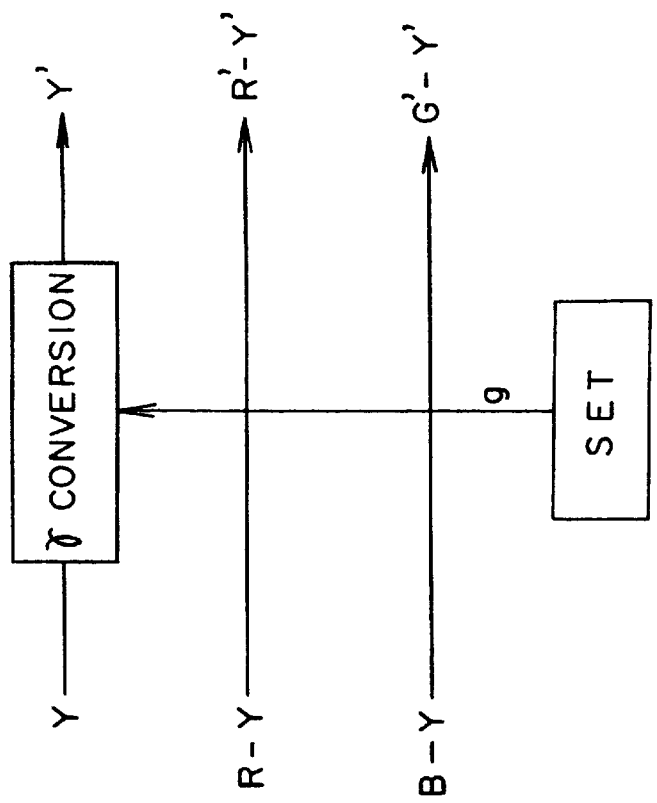
FIGS. 16 and 17 are block diagrams of typical prior art gradation correction devices.
Figure 16:
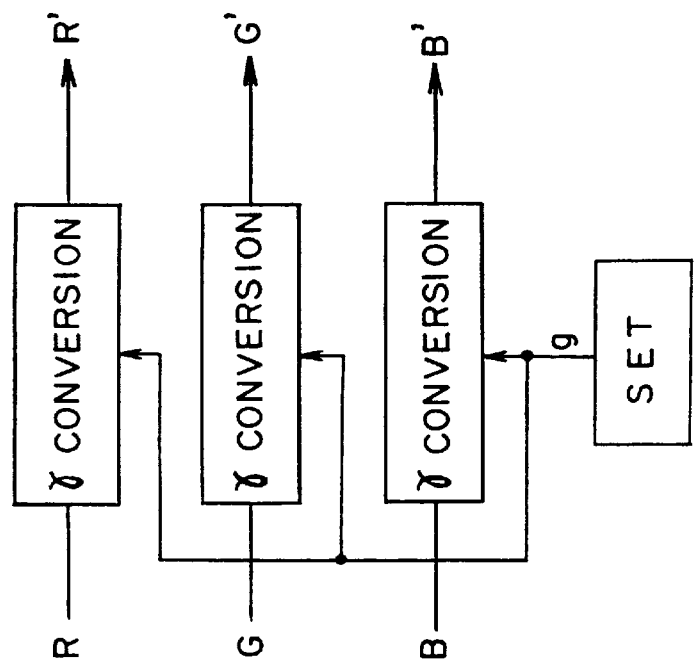

Because one condition of the function f is that the dynamic range of luminance is not changed, it is preferred to have characteristics such that the curve of the intermediate tones is changed without changing the zero black point and maximum brightness as shown in FIG. 13(A). The following function is therefore used in the present invention:

$$f(x)=x^g \quad (6)$$

where there is no change in tone when g=1, and intermediate tones become brighter when 0<g<1, and darker when g>1.

The correction coefficient calculation means 2 calculates the correction value K based on the brightness adjustment information g provided by the setting means 6. The luminance component of the R, G, and B signals after gradation conversion by the gradation correction device according to the present invention may be expressed as:

$$Y'=0.3*R'+0.59*G'+0.11*B' \quad (7).$$

Therefore, from equations 2, 3, and 4, Y' may also be expressed as $$Y'=K(Y)*Y \quad (8)$$

and from equations 5 and 8 it may be deduced that $$K(Y)=f(Y)/Y=Y^g/Y \quad (9).$$

Therefore, the correction coefficient calculation means 2 may determine the correction value K by computing equation 9.

The conversion characteristics of each component are described below.

Figure 2:
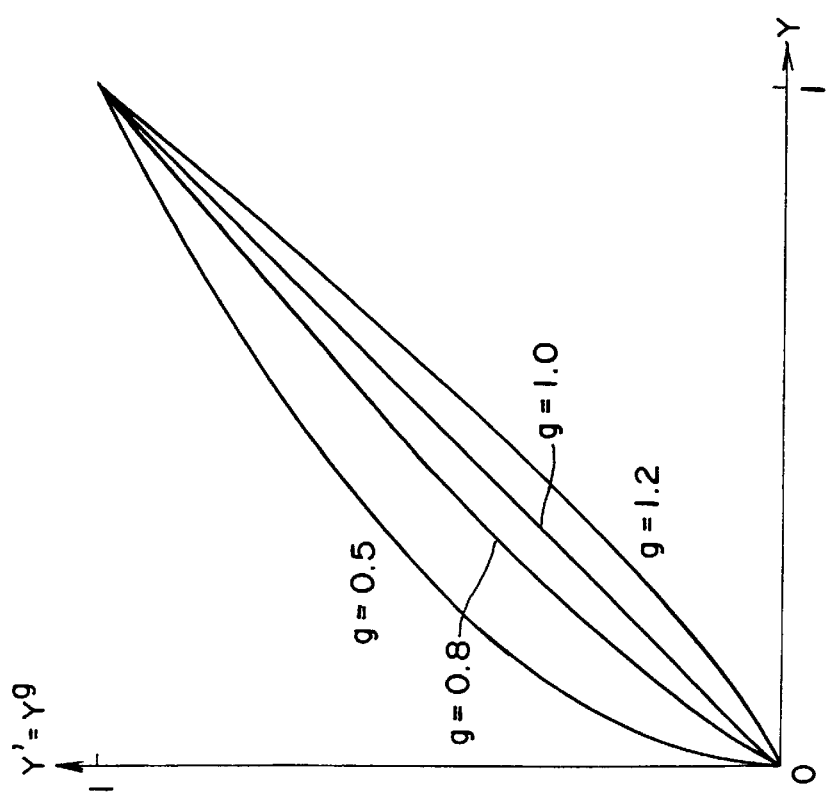
FIG. 2 is a graph showing the characteristics of the gamma correction means.

FIG. 2 is a graph illustrating the gamma conversion characteristics which change the brightness of intermediate tone levels based on equation 6.

When the image is made brighter, a conversion curve having a smaller g value is selected, and when the image is made darker, a conversion curve having a higher g value is selected. There is no change in brightness in the g=1.0 curve, as shown in FIG. 2.

Figure 3:
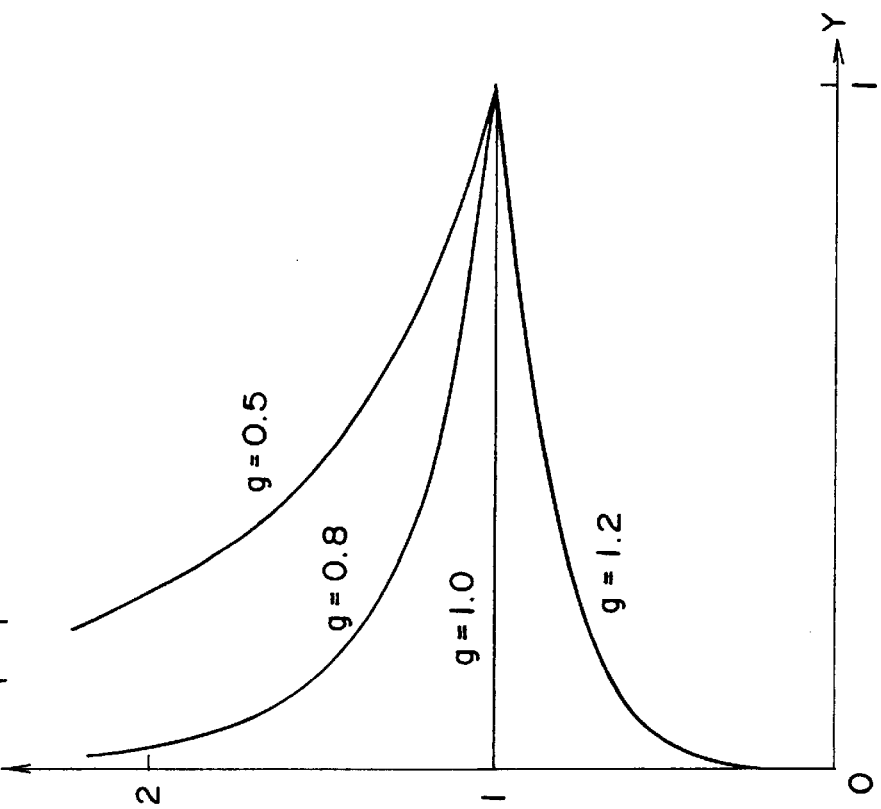
FIG. 3 is a graph showing the characteristics of the correction coefficient calculation means in the first embodiment.

FIG. 3 is a graph showing the input/output characteristics of the correction coefficient calculation means 2 corresponding to the conversion characteristics shown in FIG. 2.

The conversion characteristics are output with the value of the ratio to the luminance signal Y of the value f(y) obtained by gamma conversion of the luminance signal Y according to the conversion characteristics in FIG. 2 defined as the correction value K.

Figures 4, 5:
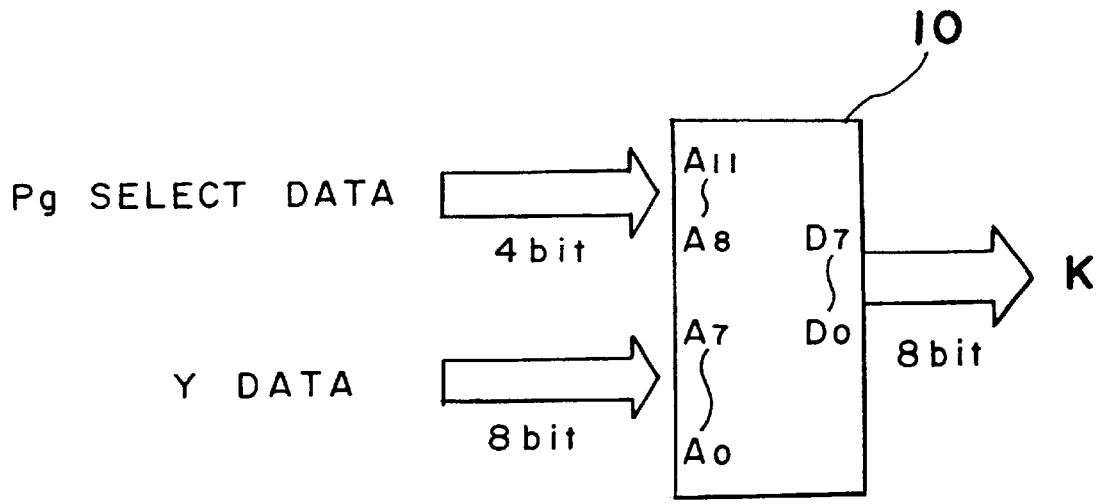
FIG. 4 shows the construction of the correction coefficient calculation means.
FIG. 5 is a table showing the characteristics of the setting means.

In the present embodiment the correction coefficient calculation means 2 is a ROM table as shown in FIG. 4, wherein the ROM 10 has a 12-bit address, 8-bit data word construction. Because the input luminance data is an eight bit word, the table for one value of g takes 256 bytes. These tables are provided in sixteen sets for the various values g. The gradation conversion characteristics are selected by applying the 4-bit page selection data from the setting means 6 to the upper address of the ROM to change the table.

The table in FIG. 5 shows the relationship between the value g and the page selection signal.

The operation of the gradation correction device according to the first embodiment of the present invention is described next.

In this example it is assumed that the value g for gradation conversion is 0.75 to brighten the intermediate tones of the image. It is further assumed that the input colors are R=0.3, G=0.4, and B=0.5, and that the luminance component of the input signal is therefore Y=0.381 from equation 1. Thus, from the equation 6, the luminance component f(Y) is:

$$f(Y)=Y'=Y^g=0.381^{0.75}=0.4849482.$$

Furthermore, from equation 9, $$K(Y)=Y'/Y=0.4849482/0.381=1.27283$$

is obtained, so that the correction value K is determined to be K=1.27283, and the values of the corrected output signal are R'=0.38185, G'=0.50913, and B'=0.63641 from equations 2, 3, and 4, respectively.

Since the R':G':B' ratio is 3:4:5, there is thus no change in the input and output signal ratios. It follows that the brightness of intermediate tone levels can be controlled without changing the hue and saturation, and when R=G=B=0 or R=G=B=1, the output equals the input.

Figure 6:
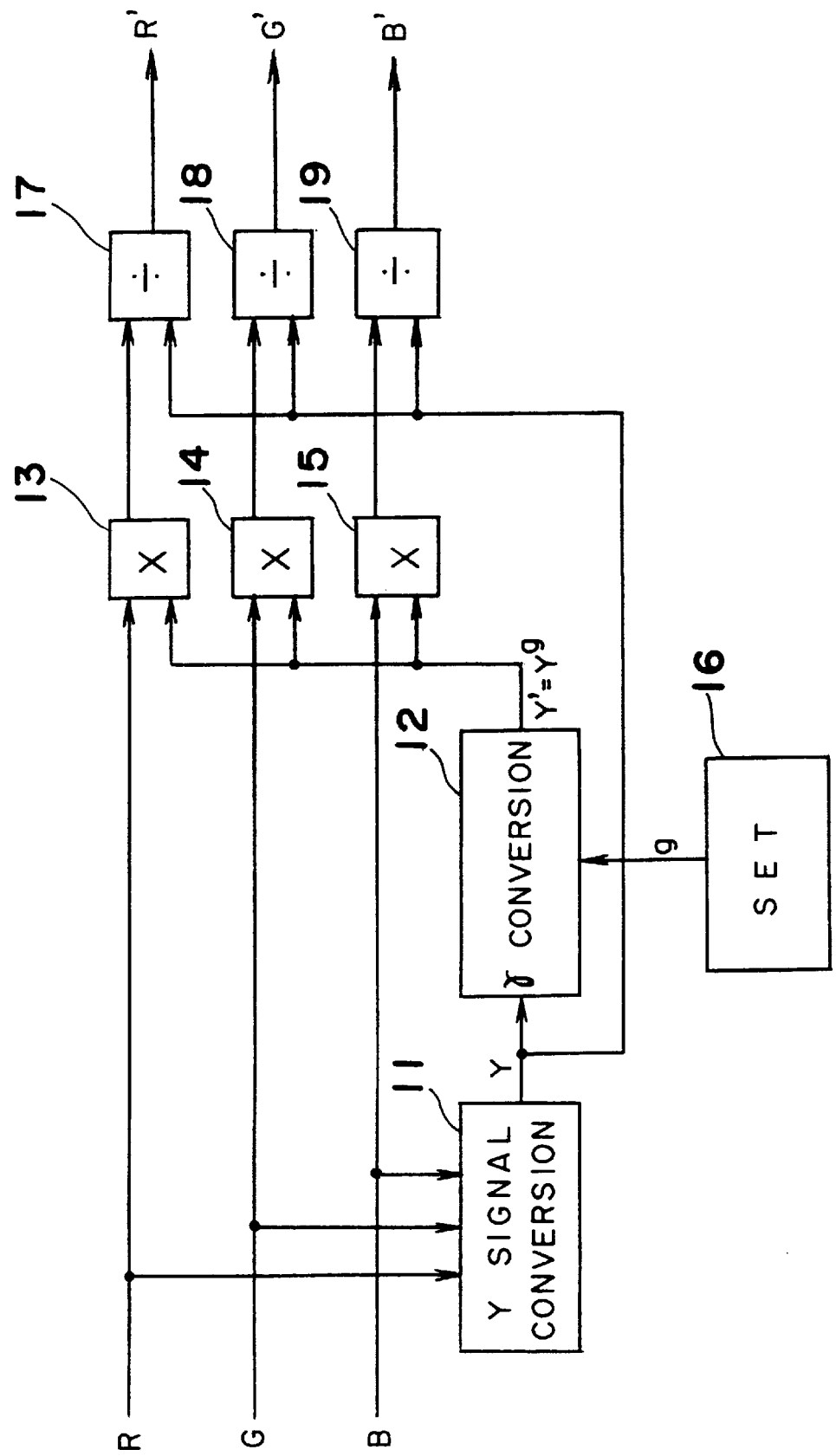
FIG. 6 is a block diagram of a gradation correction device according to a second embodiment of the present invention.

FIG. 6 is a block diagram of a gradation correction device according to an alternative embodiment of the invention.

As shown in FIG. 6, this gradation correction device comprises a luminance signal conversion means 11 which generates a luminance signal Y from R, G, and B signals, a gamma conversion means 12 to output the luminance information Y' which is gamma converted from the luminance signal extracted by the luminance signal conversion means 11, multipliers 13, 14, and 15 to multiply each of the R, G, and B signals by the luminance signal Y' output by the gamma conversion means 12, a setting means 16 to set the gradation conversion characteristics g in the gamma conversion means 12, and dividers 17, 18, and 19 to divide the output of the multipliers 13, 14, and 15 by the output from the luminance signal conversion means 11.

The luminance signal conversion means 11 is the same as the luminance signal conversion means 1 described in the first embodiment. The gamma conversion means 12 is comprised with characteristics such that the curve of the intermediate tones is changed without changing the zero black point and maximum brightness as shown in FIG. 13(A), and the desired characteristics f(Y) are provided as a table. It is to be noted that the function provided by equation 6 as shown in FIG. 2 may also be used. In a gradation correction device according to the present embodiment the same operation is applied to the R, G, and B components so that the R:G:B ratio is not changed, thereby suppressing any change in the hue and saturation while changing the gradation characteristics of intermediate tone brightness. The outputs R', G', and B' are thus defined as:

$$R'=f(Y)*R/Y \quad (10)$$

$$G'=f(Y)*G/Y \quad (11)$$

$$B'=f(Y)*B/Y \quad (12)$$

From equation 1, the luminance after gradation conversion may be expressed as:

$$Y' = 0.3*R' + 0.59*G' + 0.11*B' \quad (13)$$
$$= f(Y)*(0.3*R + 0.59*G + 0.11*B)/Y$$
$$= f(Y)$$

and the output luminance component is thus converted to the desired gradation characteristics.

The conversion characteristics of each component are described below.

FIG. 2 is a graph illustrating the gamma conversion characteristics which change the brightness of intermediate tone levels based on equation 6.

The gamma conversion means 12 is comprised of a ROM table as shown in FIG. 4 as is the correction coefficient calculation means 2 in the previously described embodiment. Plural gradation conversion tables are written to the ROM for selection by the setting means 16.

When the image is made brighter, a conversion curve having a smaller g value is selected, and when the image is made darker, a conversion curve having a higher g value is selected. There is no change in brightness in the g=1.0 curve. See FIG. 2.

The operation of the gradation correction device according to the second embodiment of the present invention is described next.

In this example it is assumed that the value g for gradation conversion is 0.75 to brighten the intermediate tones of the image. It is further assumed that the input colors are R=0.3, G=0.4, and B=0.5, and that the luminance component of the input signal is therefore Y=0.381 from equation 1. Furthermore, similar to the above, the luminance component f(Y) is:

$$f(Y)=Y'=Y^g=0.381^{0.75}=0.4849482.$$

Thus, from equations 10, 11, and 12, respectively, $$R'=f(Y)*R/Y=0.4849482\times0.3\div0.381=0.381185 \quad (10)$$

$$G'=f(Y)*G/Y=0.4849482\times0.4\div0.381=0.50913 \quad (11)$$

$$B'=f(Y)*B/Y=0.4849482\times0.5\div0.381=0.63641 \quad (12)$$

are obtained.

Since the R':G':B' ratio is 3:4:5, there is thus no change in the input and output signal ratios. Thus, the brightness of intermediate tone levels can be controlled without changing the hue and saturation.

A characteristic of this embodiment is the high effective precision of the operation because the values are divided after being multiplied.

Another alternative embodiment of a gradation correction device according to the present invention is described below.

Figure 7:
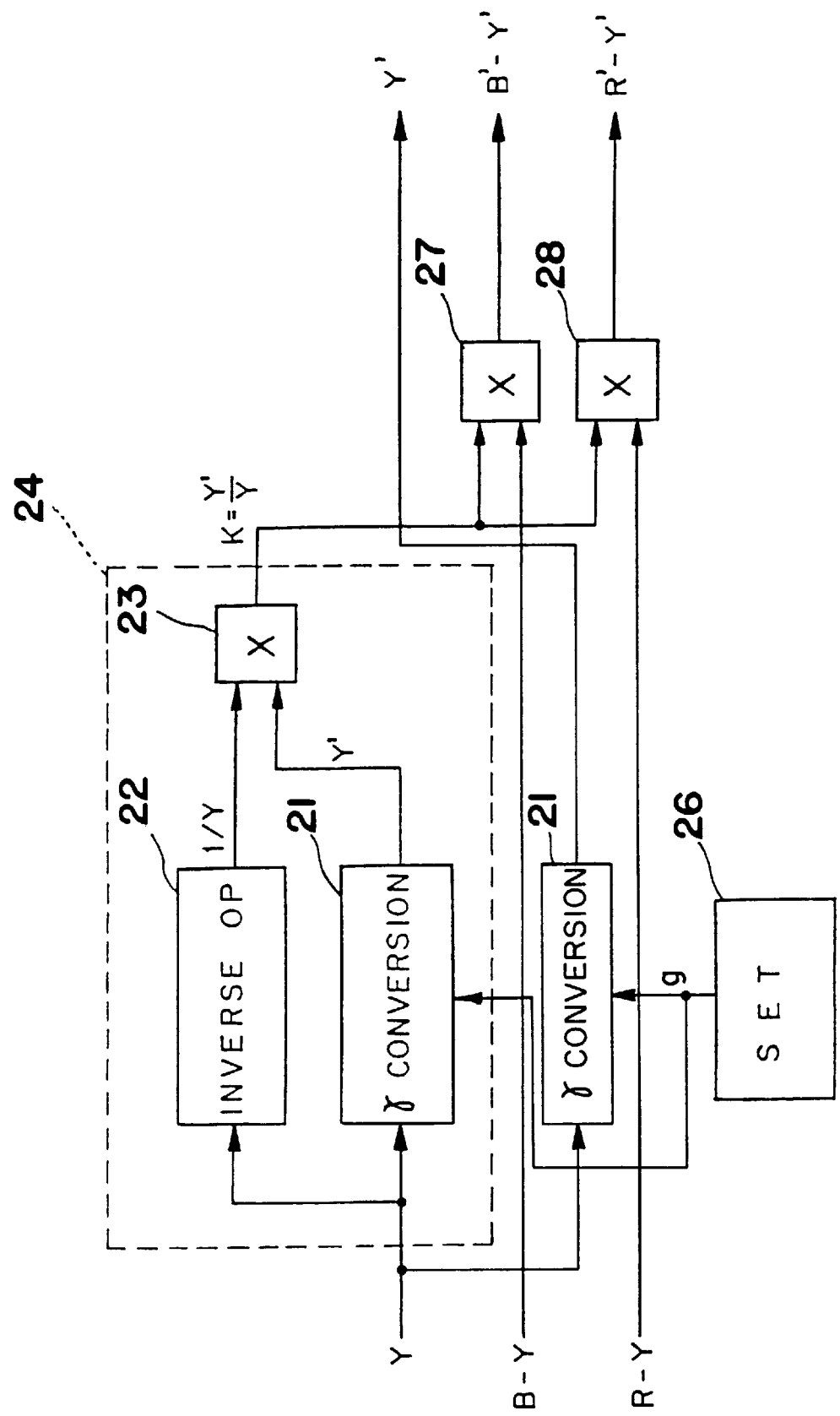
FIG. 7 is a block diagram of a gradation correction device according to a third embodiment of the present invention.

FIG. 7 is a block diagram of a gradation correction device according to the present invention which processes a luminance signal and color difference signal. As shown in the figure, this device comprises a gamma conversion means 21 to convert an input luminance signal to desired gradation characteristics Y'(=Y$^g$), an inverse operation means 22 which calculates the inverse of the input luminance signal which is equal to 1/Y, a multiplier 23 which multiplies the outputs of the gamma conversion means 21 and the inverse operation means 22 to produce a correction coefficient Y'/Y, multipliers 27 and 28 which multiply color difference signals B−Y and R−Y input on two different channels, respectively, by the correction coefficient K, and a setting means 26 which sets the conversion characteristics in the gamma conversion means 21 of the correction coefficient calculation means 24.

The gamma conversion means 21, inverse operation means 22, and multiplier 23 define a correction coefficient calculation means 24.

The object of the present embodiment is to provide a gradation correction device which, without converting the luminance signal and the color difference signal to R, G, and B signals, changes the luminance component only to the desired conversion characteristics and does not change the R:G:B ratios of the input and output signals.

If the desired gamma conversion characteristics are expressed as f, then the gamma conversion means 21 outputs a luminance signal Y' after conversion wherein Y'=f(Y).

Because one condition of the function f is that the dynamic range of luminance is not changed, it is preferred to have characteristics such that the curve of the intermediate tones is changed without changing the zero black point and maximum brightness as shown in FIG. 13(A).

The inverse operation means 22 outputs the inverse 1/Y of the input luminance signal. Therefore, the correction coefficient calculation means 24 outputs the correction coefficient K=f(Y)/Y.

This gradation correction device multiplies the correction coefficient K by two types of color difference signals, R−Y and B−Y, to suppress the change in hue and saturation while changing the gradation characteristics of intermediate tone brightness.

Therefore, the luminance signal and color difference signals output by the gradation correction device according to the present invention can be expressed by the following equations:

$$Y'=f(Y) \quad (14)$$

$$B'-Y'=(B-Y)*f(Y)/Y \quad (15)$$

$$R'-Y'=(B-Y)*f(Y)/Y \quad (16)$$

From equations 14 and 15 it is determined that B'=(f(Y)/Y)*B, obtaining the same results as the previous embodiments. The same is true of red and green.

Because one condition of the function f is that the dynamic range of luminance is not changed, it is preferred to have characteristics such that the curve of the intermediate tones is changed without changing the zero black point and maximum brightness as shown in FIG. 13(A). The f(x)=x$^g$ function is therefore used in the following description of the operation of the present embodiment as in the previous embodiments.

The operation of the gradation correction device according to the third embodiment of the present invention is described next.

In this example it is assumed that the value g for gradation conversion is 0.75 to brighten the intermediate tones of the image. It is further assumed that the input signal values are Y=0.4, B−Y=−0.2, and R−Y=0.2, and thus, the R, G, and B components of the input signal are R=0.6, G=0.3356, and B=0.2 from equation 1. Thus, the output signal values of the gradation correction device $$Y'=Y^g=0.4^{0.75}=0.503$$

$$B'-Y'=-0.2\times0.503\div0.4=-0.2515$$

$$R'-Y'=0.2\times0.503+0.4=0.2515$$

are obtained from equations 14, 15, and 16. Furthermore, since the R, G, and B components of the output signal are R'=0.7545, G'=0.422, and B'=0.2515, there is thus no change in the input and output signal ratios. The brightness of intermediate tone levels can thus be controlled without changing the hue and saturation.

Another alternative embodiment of a gradation correction device according to the present invention is described below.

Figure 8:
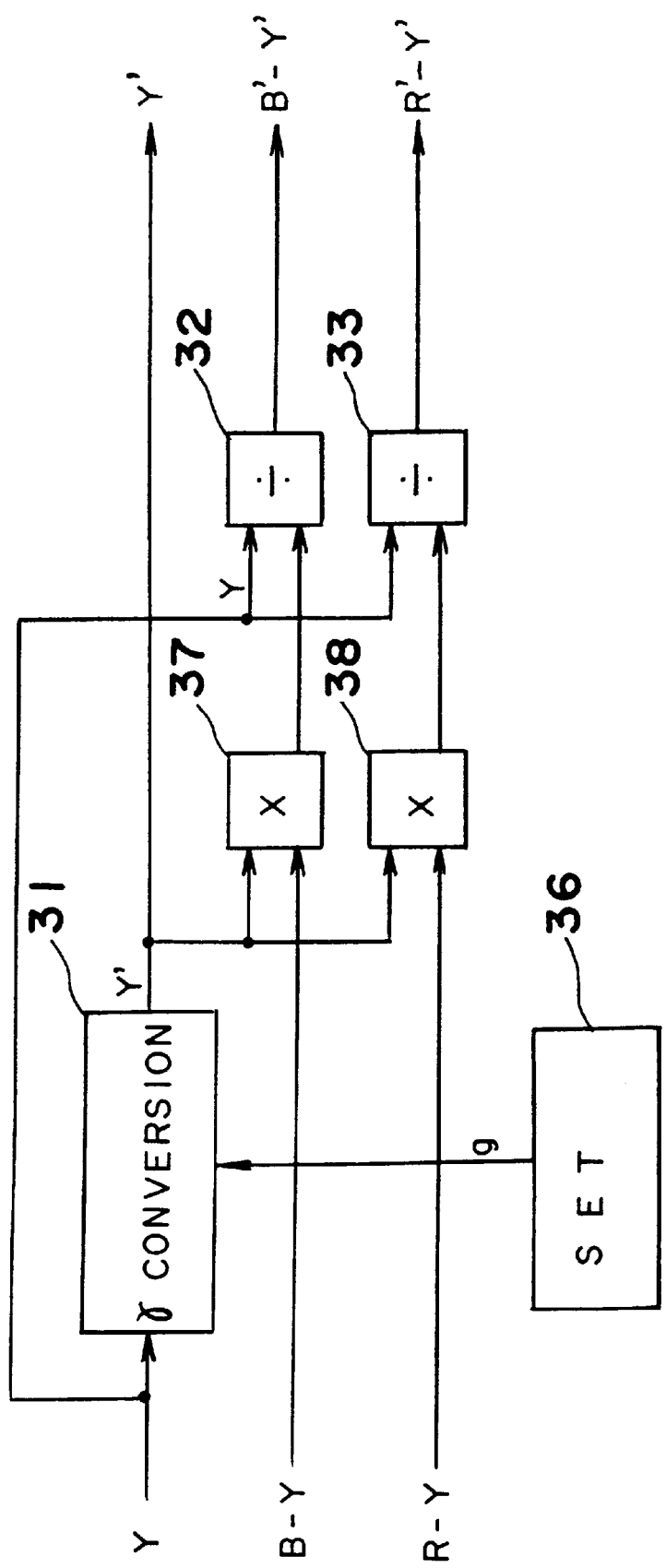
FIG. 8 is a block diagram of a gradation correction device according to a fourth embodiment of the present invention.

FIG. 8 is a block diagram of a gradation correction device according to the present invention which processes a luminance signal and color difference signal as in the previous embodiment.

As shown in FIG. 8, this device comprises a gamma conversion means 31 to convert an input luminance signal to desired gradation characteristics, multipliers 37 and 38 which multiply color difference signals input on two different channels by the output from the gamma conversion means 31, dividers 32 and 33 which divide the output from the multipliers 37 and 38 by the input luminance signal, and a setting means 36 which sets the conversion characteristics in the gamma conversion means 31.

The object of the present embodiment is to provide a gradation correction device which, without converting the luminance signal and the color difference signal to R, G, and B signals, changes the luminance component only to the desired conversion characteristics and does not change the R:G:B ratios of the input and output signals.

If the desired gamma conversion characteristics are expressed as f, then the luminance signal and color difference signals output by the gamma conversion means 31 in the present gradation correction device can be expressed by the following equations.

$$Y'=f(Y) \quad (17)$$

$$B'-Y'=(B-Y)*f(Y)/Y \quad (18)$$

$$R'-Y'=(R-Y)*f(Y)/Y \quad (19)$$

These equations are the same as those of the previous embodiment, and make it possible to control the brightness of intermediate tone levels without changing the hue and saturation.

The present embodiment is beneficial in that operation precision is high because multiplication is performed before division or the inversion operation. Furthermore, fewer operating devices are required to achieve the same operating precision.

Figure 9:
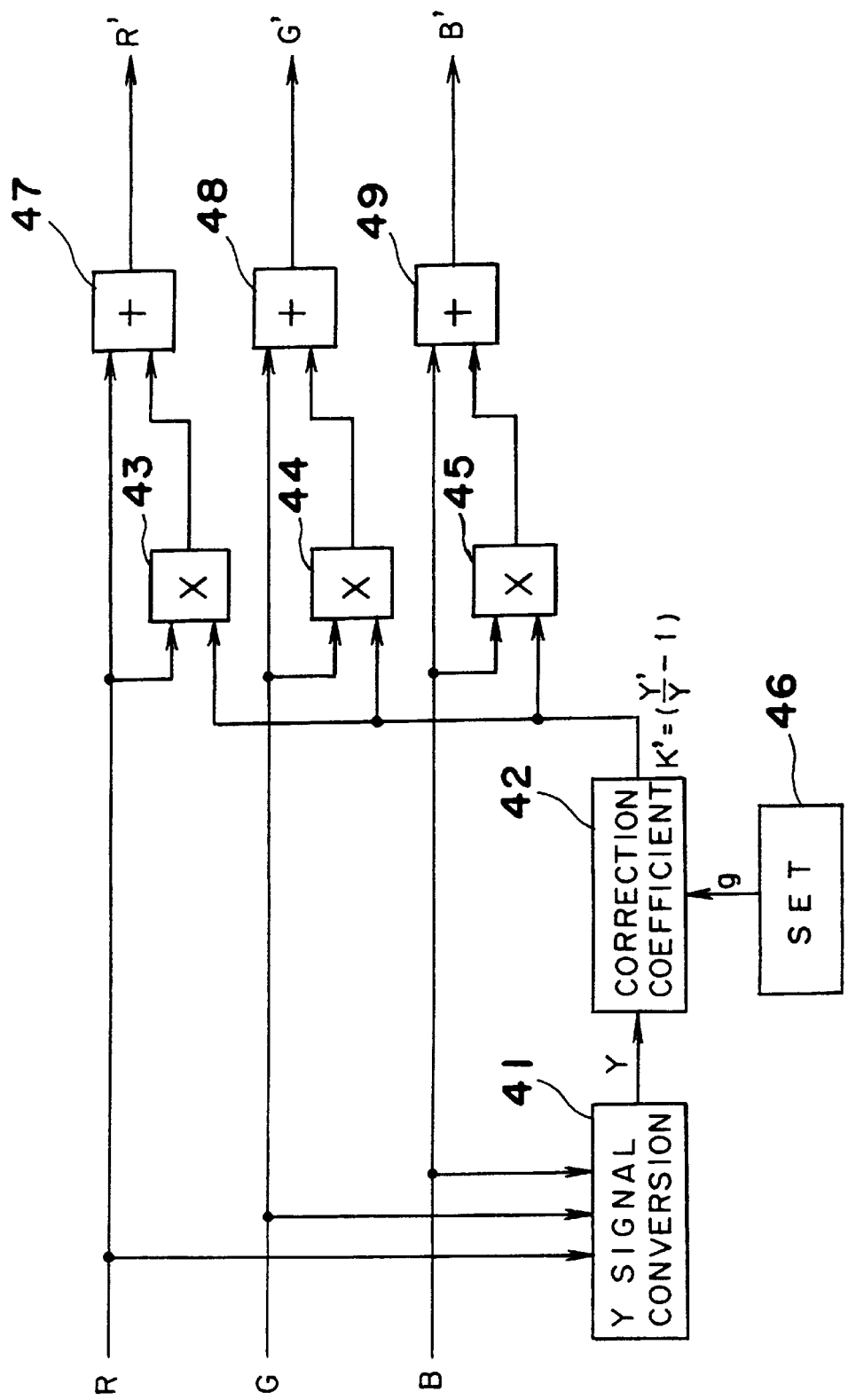
FIG. 9 is a block diagram of a gradation correction device according to a fifth embodiment of the present invention.

FIG. 9 is a block diagram of a gradation correction device according to the present invention which takes R, G, B video signals as the input signal.

As shown in FIG. 9, this device comprises a luminance signal conversion means 41 to generate a luminance signal Y from the R, G, and B signals, a correction coefficient calculation means 42 to calculate the correction value K'= (Y'/Y−1) to be applied to red, green, and blue from the luminance signal extracted by the luminance signal conversion means 41, multipliers 43, 44, and 45 to multiply the correction value K' output by the correction coefficient calculation means 42 by each of the R, G, and B signals, a setting means 46 to set the characteristics of the gradation conversion in the correction coefficient calculation means 42, and-adders 47, 48, and 49 to add the input R, G, and B signals to the outputs of the multipliers 43, 44, and 45, respectively.

The object of the present embodiment is to suppress the change in hue and saturation while changing the gradation characteristics of intermediate tone brightness and to increase operation precision without changing the R:G:B ratio of the input and output signals by multiplying each of the input R, G, and B signals by the same correction value and then adding to the result thereof the input R, G, and B signals.

The input to the correction coefficient calculation means 42 is the luminance signal Y output by the luminance signal conversion means 41, and the output therefrom is the correction coefficient K'. Thus, the outputs R', G', and B' can be expressed by the following equations:

$$R'=K'(Y)*R+R \quad (20)$$

$$G'=K'(Y)*G+G \quad (21)$$

$$B'=K'(Y)*B+B \quad (22)$$

Furthermore, if the gamma conversion characteristics which change the gradation characteristics of the luminance signal are defined as f, the luminance signal Y' after conversion can be expressed as:

$$Y'=f(Y)=Y^g \quad (23)$$

The function f is defined as in the previous embodiments by equation 6.

From equation 1, the luminance signal after gradation conversion is expressed as:

$$Y'=0.3*R'+0.59*G'+0.11*B' \quad (24)$$

Therefore, from equations 20, 21, 22, and 24, Y' may also be expressed as $$Y'=K'(Y)*Y+Y$$

and from equations 23 and 24 it may be deduced that $$K'(Y)=(f(Y)-Y)/Y=(Y'/Y-1) \quad (25)$$

Therefore, the correction coefficient calculation means 42 may determine the correction value K' by computing equation 25.

The conversion characteristics of each component are described below.

Figure 10:
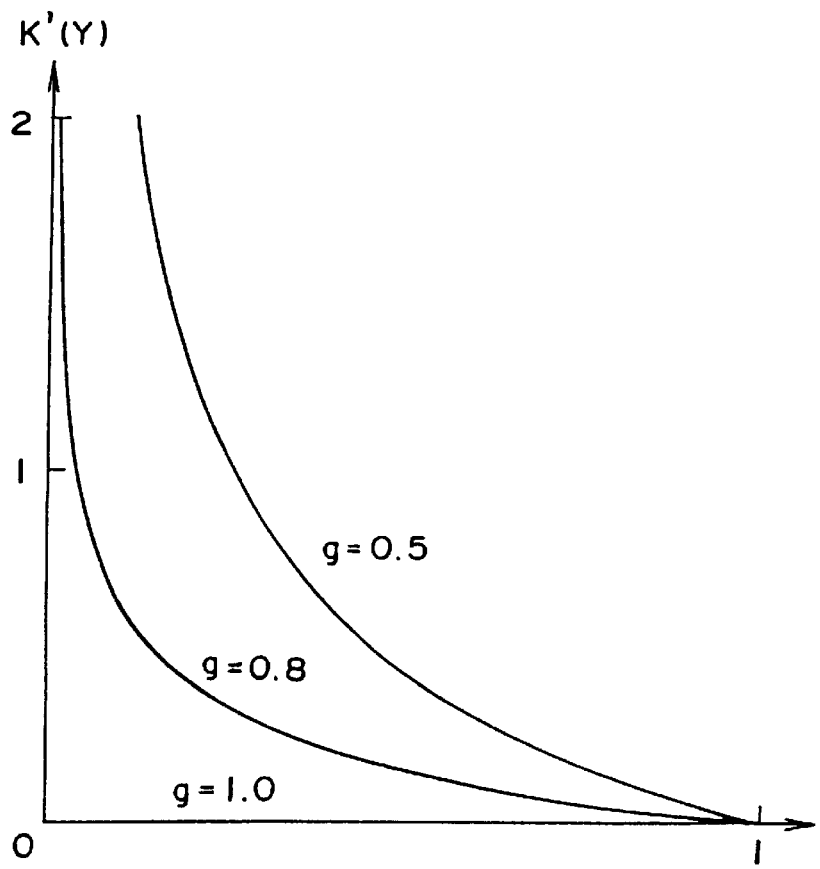
FIG. 10 is a graph showing the characteristics of the correction coefficient calculation means in the fifth embodiment.
Figure 15:
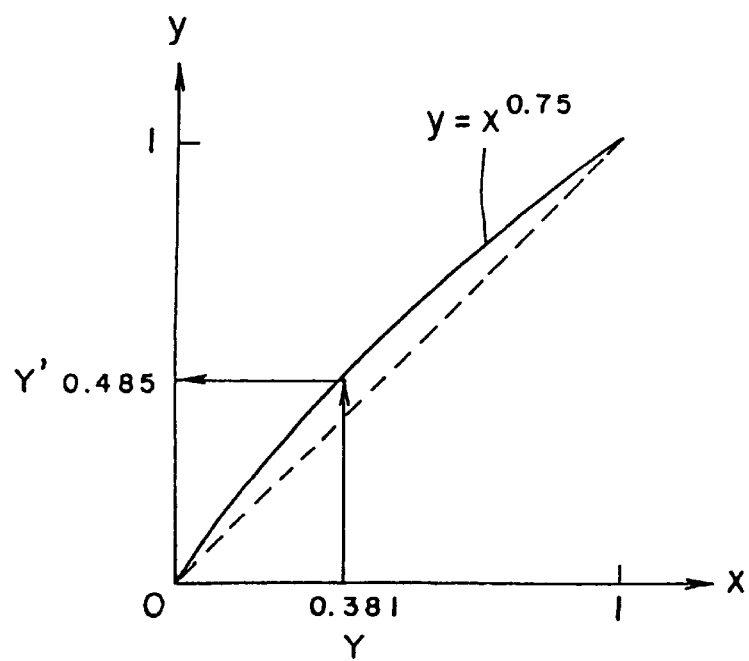
FIG. 15 is a graph showing the characteristics of a conventional gray scale correction method as applied to the luminance component.

FIG. 10 is a graph illustrating the input/output characteristics of the correction coefficient calculation means 42 in relation to the conversion characteristics shown in FIG. 2.

The conversion characteristics are output with the value of the ratio to the luminance signal Y of the difference between the value f(y) obtained by gamma conversion of the luminance signal Y according to the conversion characteristics in FIG. 2 and the luminance signal Y defined as the correction value K.

The operation of the gradation correction device according to the present embodiment of the present invention is described next.

In this example it is assumed that the value g for gradation conversion is 0.75 to brighten the intermediate tones of the image. It is further assumed that the input colors are R=0.3, G=0.4, and B=0.5, and that the luminance component of the input signal is therefore Y =0.381 from equation 1. The luminance component Y' in this output signal is 0.4849482 from equation 6. Furthermore, from equation 25,

K'=(Y'/Y−1)=0.4849482÷0.381−1=0.27283 is obtained, and from equations 20, 21 and 22,

R'=K'(Y)*R+R=0.27283×0.3+0.3 =0.38185 (20)

G'=K'(Y)*G+G=0.27283×0.4+0.4 =0.50913 (21)

B'=K'(Y)*B+B=0.27283×0.5+0.5 =0.63641 (22)

are obtained, respectively. Furthermore, the R':G':B' ratio is 3:4:5, and there is thus no change in the input and output signal ratios. Thus, the brightness of intermediate tone levels can be controlled without changing the hue and saturation.

The value of the correction coefficient becomes smaller in the present embodiment because the correction coefficient K' representing the changes in the R, G, and B components is smaller than correction coefficient K representing the R, G, and B inputs themselves as in the previous embodiments. Thus, with the same number of effective digits, a higher operation precision is therefore achieved with an operation using the same number of effective digits.

Figure 11:
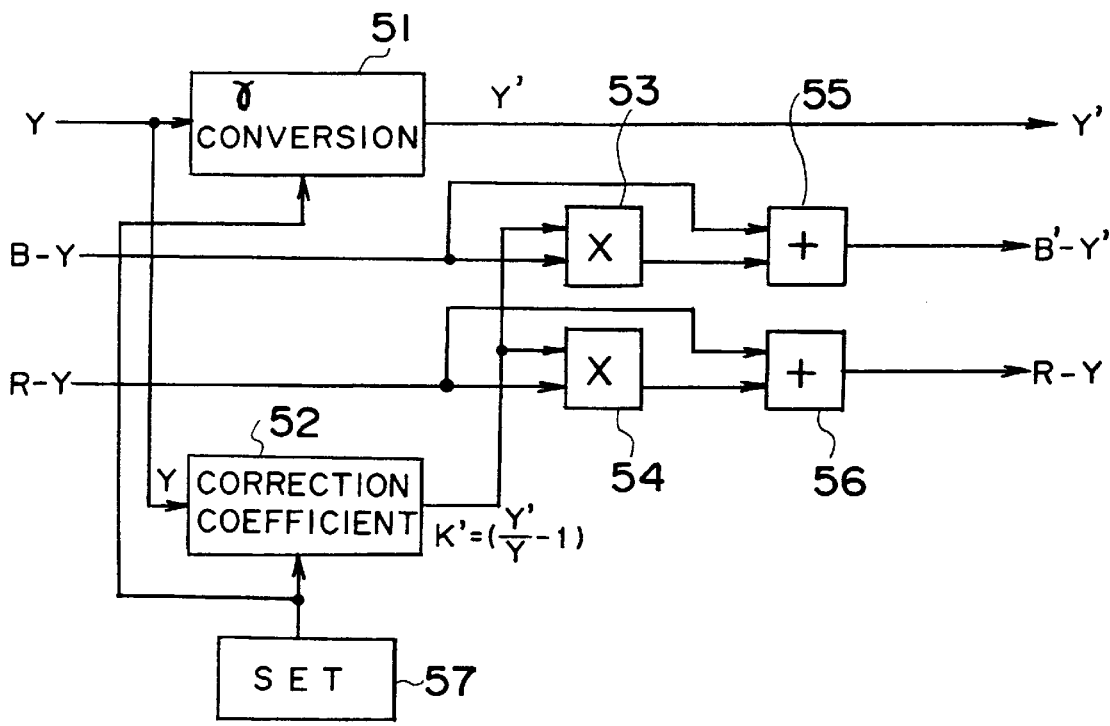
FIG. 11 is a block diagram of a gradation correction device according to a sixth embodiment of the present invention.

FIG. 11 is a block diagram of a gradation correction device according to the present invention which processes a luminance signal Y and color difference signals R−Y and B−Y.

As shown in FIG. 11, the device comprises a gamma conversion means 51 to convert an input luminance signal Y to desired gradation characteristics Y', a correction coefficient calculation means 52 to calculate the correction value K'=(Y'/Y−1), multipliers 53 and 54 which multiply color difference signals input on two different channels by the correction value K', adders 55 and 56 which add the each output from the multipliers 53 and 54 with corresponding color difference signal input on two different channels, and a setting means 57 which sets the conversion characteristics in the gamma conversion means 51.

By the circuit of FIG. 11, the luminance signal Y' and color difference signals B'−Y' and R'−Y' can be expressed by the following equations.

Y'=f(Y) (23)

B'−Y'=(B−Y)*{f(Y)/Y−1}+(B−Y)=(B−Y)*f(Y)/Y (24)

R'−Y'=(R−Y)*{f(Y)/Y−1}+(B−Y)=(R−Y)*f(Y)/Y (25)

which are substantially equal to equations 17, 18 and 19 described above. Thus, a further description therefor is omitted.

Figure 12:
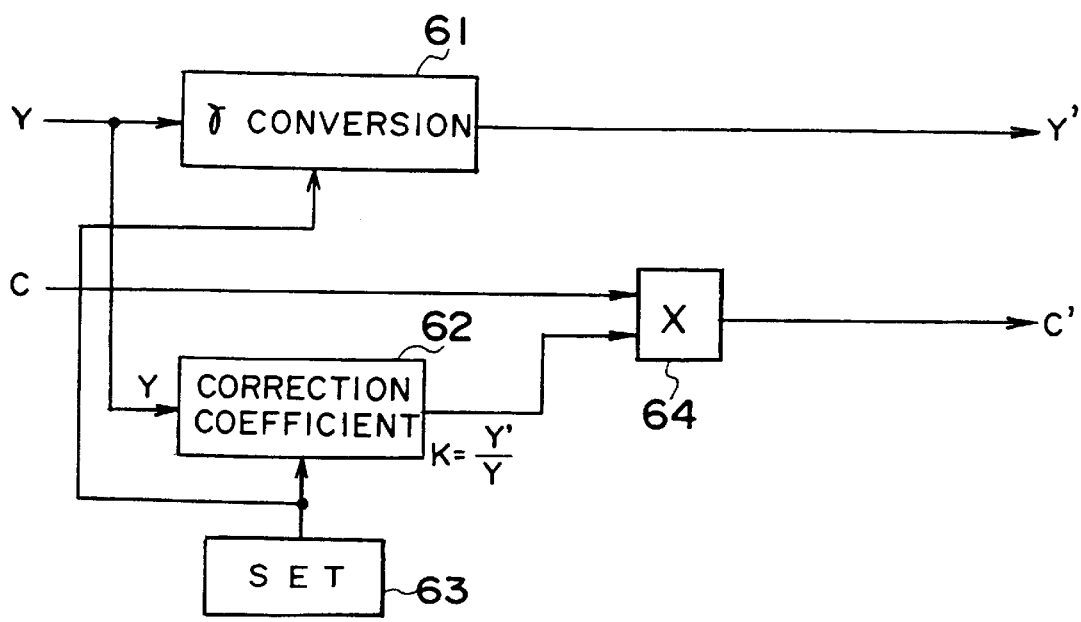
FIG. 12 is a block diagram of a gradation correction device according to a seventh embodiment of the present invention.

FIG. 12 is a block diagram of a gradation correction device according to the present invention which processes a luminance signal Y and a chrominance signal C.

As shown in FIG. 12, the device comprises a gamma conversion means 61 to convert an input luminance signal Y to desired gradation characteristics Y', a correction coefficient calculation means 62 to calculate the correction value K=Y'/Y, a multiplier 64 which multiplies the chrominance signal C by the correction value K, and a setting means 63 which sets the conversion characteristics in the gamma conversion means 61.

The chrominance signal C is formed by two phase modulation of R−Y and B−Y signals using a subcarrier wave having a frequency $f_s$, and can be expressed as:

$$C = \frac{R-Y}{1.14}\cos(2\pi f_s) + \frac{B-Y}{2.03}\sin(2\pi f_s)$$

$f_s = 3.58$ MHz

Thus, by processing the chrominance signal by the following equation:

C'=f(Y)*C/Y (26)

a processed chrominance signal C'

$$C' = \frac{R'-Y'}{1.14}\cos(2\pi f_s) + \frac{B'-Y'}{2.03}\sin(2\pi f_s)$$

is obtained.

By the circuit of FIG. 12, a similar effect as described above can be obtained for the chrominance signal C.

It is to be noted that, in some of the above embodiments, R−Y and B−Y have been used by way of example for the color difference signals in the above embodiments, but the same results can be obtained using the amplitude normalized signals PB (=(B−Y)/(B−Y)max) and PR (=(R−Y)/(R−Y) max). Gradation correction can even be applied with a two-phase modulated chrominance signal before demodulation with the same configuration but with processing becoming a single channel.

Furthermore, a function of $Y^g$ was used for gamma correction in the above descriptions, but a non-linear function with a greater degree of freedom can also be used with no problems.

Also in the preferred embodiments above a ROM table was used in the gamma conversion means and the correction coefficient calculation means, and the contents of the table were changed by a setting means, but a RAM device may also be used and the contents of the table recalculated by a CPU during system start up and when the settings are changed. In addition, the contents described in the equations used in the preferred embodiments above can be calculated in hardware instead of using tables.

Furthermore, a suitable limiter is required in practical application because an extremely high value results when the luminance component approaches zero with the correction coefficient calculation equations described in the embodiments hereinabove.

When a gradation correction device according to the present invention is used, effective brightness adjustment is possible with gradation correction in which the hue and saturation do not change without exceeding the dynamic range of a device using R, G, and B inputs and luminance and color difference signal inputs,.or luminance and saturation signal inputs. By applying this method to brightness adjustment in a printer or other narrow dynamic range device, and to brightness correction in a video camera with backlit subjects wherein the dynamic range is extremely wide, it is therefore possible to change the gray scale characteristics of the luminance component of the image and to control the brightness using changes in the image histogram as easily as with conventional methods applied to monochrome signals.

As thus described, the effect is natural and the range of applications for this method and device is extremely wide.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gradation correction method for processing an image having red, green and blue signals, the method comprising the steps of:

converting said red, green and blue signals into a luminance signal;

using a digital table for receiving a digital address Y which represents the luminance signal and producing a digital output K which represents a correction coefficient defined as K=Y'/Y, wherein Y' represents a gamma converted luminance signal; and multiplying said correction coefficient with each of said red, green and blue output signals, respectively, whereby outputs of first, second and third multipliers are converted red signal, converted green signal, and converted blue signal, respectively.

2. A gradation correction device for processing an image having red, green and blue signals, comprising:

a converter for converting said red, green and blue signals into a luminance signal;

a digital table for receiving a digital address Y which represents the luminance signal and producing a digital output K which represents a correction coefficient defined as K=Y'/Y, wherein Y' represents a gamma converted luminance signal; and first, second and third multipliers for multiplying said correction coefficient with each of said red, green and blue signals, respectively, whereby outputs of said first, second and third multipliers are converted red signal, converted green signal and converted blue signal, respectively.

3. A gradation correction device for correcting red, green and blue signals comprising:

means for providing red, green and blue signals which correspond to a video image;

a luminance signal conversion means for generating a luminance signal from said red, green and blue signals;

a gamma conversion means for gamma converting the luminance signal to predetermined gradation characteristics and for producing a gamma converted luminance signal;

a multiplier means for multiplying the gamma converted luminance signal with each of said red, green and blue signals; and a divider means for dividing the outputs of said multiplier means by the output of the luminance signal.

4. A gradation correction device for correcting red, green and blue signals comprising:

means for providing red, green and blue signals which correspond to a video image;

a luminance signal conversion means for generating a luminance signal from said red, green and blue signals;

a correction coefficient calculation means for calculating a ratio of a difference between a gamma converted luminance signal and non-converted luminance signal to the non-converted luminance signal;

a multiplier means for multiplying said ratio with each of said red, green and blue signals; and an adder means for adding each of the outputs of said multiplier means to corresponding one of said red, green and blue signals.

* * * * *

UNITED STATES PATENT AND TRADE MARK OFFICE
CERTIFICATE OF CORRECTION

PATENT NO. : 6,101,271
DATED : August 8, 2000
INVENTOR(S) : Yamashita et al.

It is certified that error appears in the above-identified patent and that said Letters Patent is hereby corrected as shown below:

On the Cover page, Field [56], under U.S. PATENT DOCUMENTS:

5,517,333   5/1996   "Sakaue et al." should read --Tamura et al.--

Signed and Sealed this

Twenty-fourth Day of April, 2001

Attest:

NICHOLAS P. GODICI

Attesting Officer     Acting Director of the United States Patent and Trademark Office